(12) United States Patent
Sekfane

(10) Patent No.: US 7,726,287 B2
(45) Date of Patent: Jun. 1, 2010

(54) METHOD AND DEVICE FOR CONTROLLING A VALVE FOR RECYCLING GASES BURNED DURING AN ENGINE STARTING PHASE

(75) Inventor: Nacer Sekfane, Arpajon (FR)

(73) Assignee: Renault S.A.S., Boulogne, Billancourt (FR)

( * ) Notice: Subject to any disclaimer, the term of this patent is extended or adjusted under 35 U.S.C. 154(b) by 57 days.

(21) Appl. No.: 12/093,385

(22) PCT Filed: Nov. 28, 2006

(86) PCT No.: PCT/FR2006/051242

§ 371 (c)(1),
(2), (4) Date: Jul. 2, 2008

(87) PCT Pub. No.: WO2007/063246

PCT Pub. Date: Jun. 7, 2007

(65) Prior Publication Data

US 2008/0276916 A1 Nov. 13, 2008

(30) Foreign Application Priority Data

Dec. 2, 2005 (FR) .................................. 05 12247

(51) Int. Cl.
*F02B 47/08* (2006.01)
*F02B 47/00* (2006.01)
(52) U.S. Cl. ................. 123/568.11; 123/568.2
(58) Field of Classification Search ........... 123/568.11, 123/568.12, 568.2, 568.21, 179.16; 60/605.1, 60/605.2, 600, 602; 701/108
See application file for complete search history.

(56) References Cited

U.S. PATENT DOCUMENTS

| 3,980,063 | A | * | 9/1976 | Henault | 123/568.27 |
| 6,470,864 | B2 | * | 10/2002 | Kim et al. | 123/568.12 |
| 6,883,504 | B1 | | 4/2005 | Hynes et al. | |

FOREIGN PATENT DOCUMENTS

| DE | 199 21 505 | 11/1999 |
| EP | 1 138 937 | 10/2001 |
| JP | 55 119945 | 9/1980 |
| JP | 2003 20981 | 1/2003 |

* cited by examiner

*Primary Examiner*—Mahmoud Gimie
(74) *Attorney, Agent, or Firm*—Oblon, Spivak, McClelland, Maier & Neustadt, L.L.P.

(57) ABSTRACT

A method carried out by a control device, the method holding a valve EGR completely opened during a determined short time after a starting phase of a diesel engine, which is provided with an EGR recirculation, and controlling the valve EGR in a partially closed state during the starting time of the engine to increase the engine speed to a threshold speed corresponding to the end of the starting phase. The control is progressively carried out according to a determined closing instruction via a calibration by using data representative of engine speed and ambient temperature. The dynamically controlled recirculation makes it possible, in particular, to accumulate more fuel at the staring phase without increasing injected quantities, to increase the speed of engine actuated by a starter, and to avoid engine blocking.

18 Claims, 2 Drawing Sheets

METHOD AND DEVICE FOR CONTROLLING A VALVE FOR RECYCLING GASES BURNED DURING AN ENGINE STARTING PHASE

TECHNICAL FIELD OF THE INVENTION

The present invention relates, in the field of internal combustion engines, to external combustion control systems using exhaust gas recirculation (EGR). The invention relates more specifically to a method and to a device for controlling an EGR valve during the start-up phase of the diesel engine.

TECHNOLOGICAL BACKGROUND OF THE INVENTION

As is known, the principle of recirculating the burnt gases (EGR) lies in introducing a given amount of exhaust gases in place of some of the fresh air on the inlet side of diesel or gasoline engines. External EGR systems use a valve to do that, which valve taps off some of the exhaust gases and reintroduces them into the inlet side. This principle makes it possible to limit the emissions of NOx (the greater the fraction of gas recirculated, the greater the reduction in emissions) but reduces engine performance.

It is necessary to draw distinctions between two methods by which this solution is employed: high-pressure recirculation and low-pressure recirculation. While low-pressure recirculation consists in tapping exhaust gases off after the turbine and reintroducing them before the charge air compressor (the gases sometimes also being reintroduced upstream of the intercooler that follows the compressor), high-pressure recirculation (turbocharged engines) on the other hand consists in tapping exhaust gases off upstream of the turbine and reintroducing them downstream of the compressor. High-pressure recirculation therefore has the advantage, over low-pressure recirculation, of requiring a shorter circuit (just one valve, rapid system response). The pressure difference between the exhaust and the inlet side is used as the driving force, the flow rate being regulated by the valve.

At the present time, in the case of a high-pressure EGR circuit associated with a diesel engine that has low compression ratios of no higher than 16, it is becoming increasingly difficult to perform a cold start because of the inferior thermodynamic conditions (lower temperature and pressure) in the cylinder. In the text which follows, a cold start is to be understood as being a start performed in a range of temperatures starting from −30° C. There is therefore a need to improve the starting of the most recent-generation turbocharged diesel engines with low compression ratios.

Exhaust gas recirculation capable of adapting to low temperature conditions in low engine speed phases is known from document EP 1 138 928. That document preferably envisions starting the engine with the EGR deactivated, the opening of the EGR valve being initiated when the engine is receiving a sufficient charge. Alternatively, the EGR valves can be left open during starting. However, in such cases, the engine often stalls through lack of oxygen just after it has started. Even if the valves are left open just a small amount in order to reduce the recirculation, the engine cannot then run in a stable manner at idling speed.

Because of the various difficulties encountered, the prior art therefore envisions closing the EGR valve when cold, as per the teachings of document EP 1 101 917 in particular.

Other solutions, for engines with low compression ratios, consist in using a high-speed ceramic glow plug or in enhancing the technical design of the inlet side. These solutions are still not well enough optimized to guarantee that the engine will make a problem-free cold start.

GENERAL DESCRIPTION OF THE INVENTION

It is therefore an object of the present invention to alleviate one or more of the disadvantages of the prior art by proposing, in a circuit that employs exhaust gas recirculation EGR, a method for controlling an EGR valve during the engine start-up phase that will allow an effective cold start, particularly on engines of the diesel engine type with low compression ratios.

To this end, the invention relates to a method for controlling at least one exhaust gas recirculation EGR valve during the start-up phase of a diesel engine of the type provided with an external system for controlling combustion using EGR, implemented by a control device provided with a processing unit, characterized in that it comprises a step in which the control device opens the EGR valve to the wide open position, for a short time measured from the moment the starting of the engine is initiated and, at least for the period over which the engine is starting so that the engine speed can be increased to an end-of-start threshold speed:

- a step during which the control device gathers data representative of an engine speed and an ambient temperature, these data being supplied by sensors;
- a step of dynamic calibration using the processing unit to determine an EGR valve openness setpoint as a function of the data supplied to the control device during the data-gathering step;
- a progressive step in which the control device partially closes the EGR valve in accordance with said openness setpoint determined during the dynamic calibration step.

Thus, the method according to the invention makes it possible to optimize starting by following an EGR valve openness law that is suited to the requirements of the engine. Reducing the openness progressively makes it possible to reduce or even eliminate the risk of stalling (through lack of oxygen): in the second part of the start-up phase, the valve is closed enough to prevent there being too great a volume of recirculated gases in the inlet circuit.

According to another particular feature, the method according to the invention comprises a step in which the EGR valve is fully closed by the control device at least when the end-of-start threshold speed is reached.

Thus, closure is obtained at the end of a gradual process which is dependent on the increase in engine speed. Closure occurs when the threshold is reached, at the latest. This threshold is preferably lower than the idling speed in order to avoid engine instability after start-up.

According to another particular feature, the method according to the invention comprises a preliminary step during which the processing unit calculates the threshold for the end-of-start threshold speed using a look-up table stored in memory in the control device and taking account of the ambient temperature initially gathered.

According to another particular feature, the data-gathering step involves measuring the temperature of an engine coolant in order to measure said ambient temperature.

According to another particular feature, the dynamic calibration step uses a setpoints map in which two parametrizing axes are represented by engine speed information on the abscissa axis and ambient temperature information on the ordinate axis, a third axis being provided for the openness setpoint so that an actuator which adjusts how open the EGR valve is can be controlled, said map being pre-stored in memory by the control device in the form of a look-up table.

According to another particular feature, the control setpoint represents a percentage indicating how open/closed the EGR valve is.

According to another particular feature, the step during which the EGR valve is wide open is performed only if the ambient temperature does not exceed a calibrateable temperature threshold and if the engine has not started, the start status of the engine being detected by the control device using information of the startbit type.

According to another particular feature, the dynamic calibration step comprises linear interpolation performed by calculation means of the processing unit in order to determine the openness setpoint from the data supplied to the control device during the data-gathering step.

According to another particular feature, the progressive step in which the EGR valve is partially closed comprises:
- a first substep during which partial closure is performed at a slow first overall rate of closure; followed by
- a second substep during which partial closure is continued at a second overall rate of closure that is much faster than said first rate.

According to another particular feature, the dynamic calibration step also makes use of an altitude indicating parameter by means of which the openness setpoint is corrected or weighted.

According to another particular feature, the method according to the invention is implemented using a control device of the computer type and using a recirculation system of the high pressure type in which the EGR valve is opened by a control signal originating from the control device during the wide opening step in order to recirculate an air/fuel mixture that has not undergone combustion from upstream of an exhaust turbine to an inlet manifold of the engine.

According to another particular feature, the method according to the invention comprises a step of controlling a routing means in order to direct the entire flow of recirculated gas to a bypass pipe parallel to an EGR cooler.

According to another particular feature, the method comprises a step whereby the control device controls a variable-geometry turbocompressor in order to keep the vanes of the turbine closed, in order to increase the flow rate of recirculated gas.

An additional object of the invention is to propose a control device which uses EGR in such a way as to improve the increase in engine speed during start-up.

To this end, the invention relates to a device for controlling at least one exhaust gas recirculation EGR valve during the start-up phase of a diesel engine of the type provided with an external combustion control system using EGR, the device comprising a processing unit, characterized in that it comprises:
- memory storage means for storing at least one item of information representative of an end-of-start threshold speed;
- means of detecting a start-up phase;
- actuator means designed to keep the EGR valve wide open for a short time measured from the moment the starting of the engine is initiated;
- means of estimating an engine speed;
- means of estimating an ambient temperature;
- means of gathering data representative of the estimated ambient temperature and of the estimated engine speed;
- pairing means for pairing an EGR valve openness setpoint with the data supplied by the data-gathering means and of using this setpoint to control the actuator means in order to control partial closure of the EGR valve during the start-up phase.

According to another particular feature, the pairing means are designed to compare, during the start-up phase, an estimated engine speed value supplied by the data-gathering means with a value representative of the end-of-start threshold speed, the pairing means delivering a setpoint to fully close the EGR valve as soon as the threshold value is reached.

According to another particular feature, the processing unit is designed to calculate an end-of-start threshold speed beforehand using a look-up table stored in the memory storage means making it possible to take account of the ambient temperature gathered initially in order to determine said threshold speed.

An additional object of the invention is to propose a program that can be run by a computer system that will enable the EGR valve to be controlled adequately during a cold start phase.

To this end, the invention relates to a computer program that can be loaded directly into the memory of a computer to control the steps of the method of the invention when said program is run on a computer.

BRIEF DESCRIPTION OF THE DRAWINGS

The invention, together with its features and advantages, will become more clearly apparent from reading the description given with reference to the attached drawings in which.

DESCRIPTION OF THE PREFERRED EMBODIMENTS OF THE INVENTION

Figure 1A:
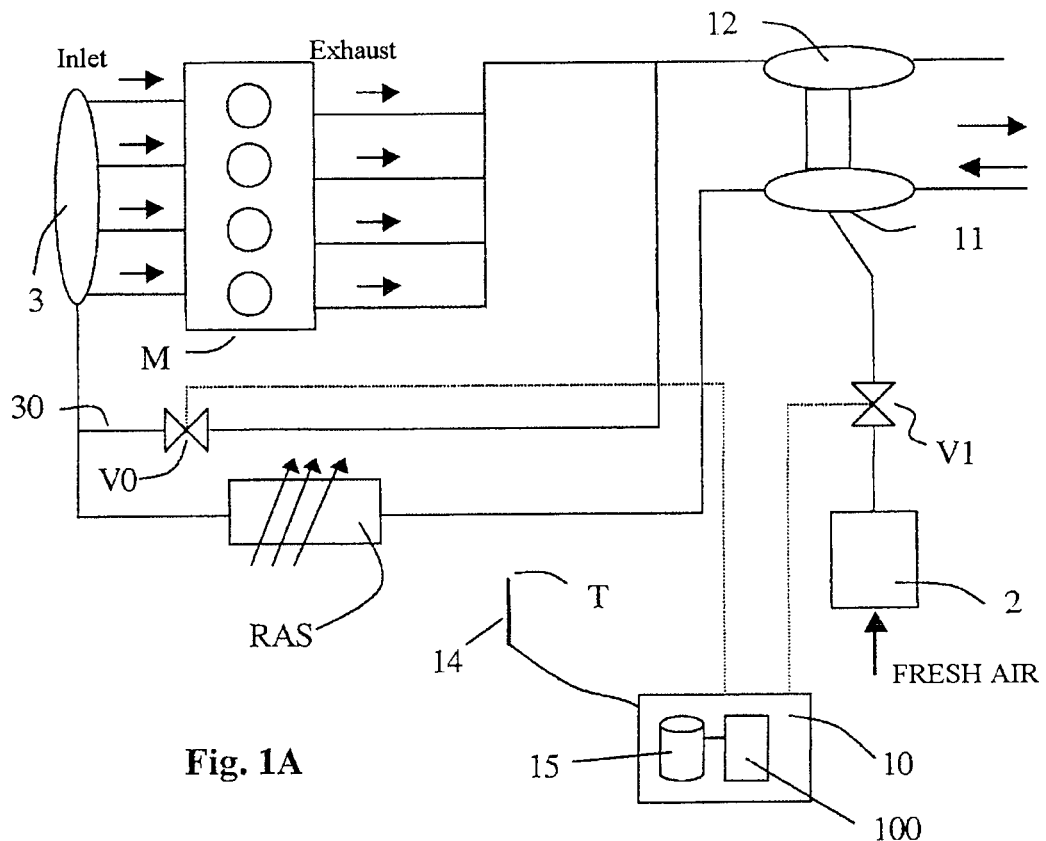
FIGS. 1A and 1B each depict a functional diagram illustrating a control device according to the invention capable of controlling high-pressure EGR by gradually closing the EGR valve as a function of the increase in speed and as a function of temperature conditions.
Figure 1B:
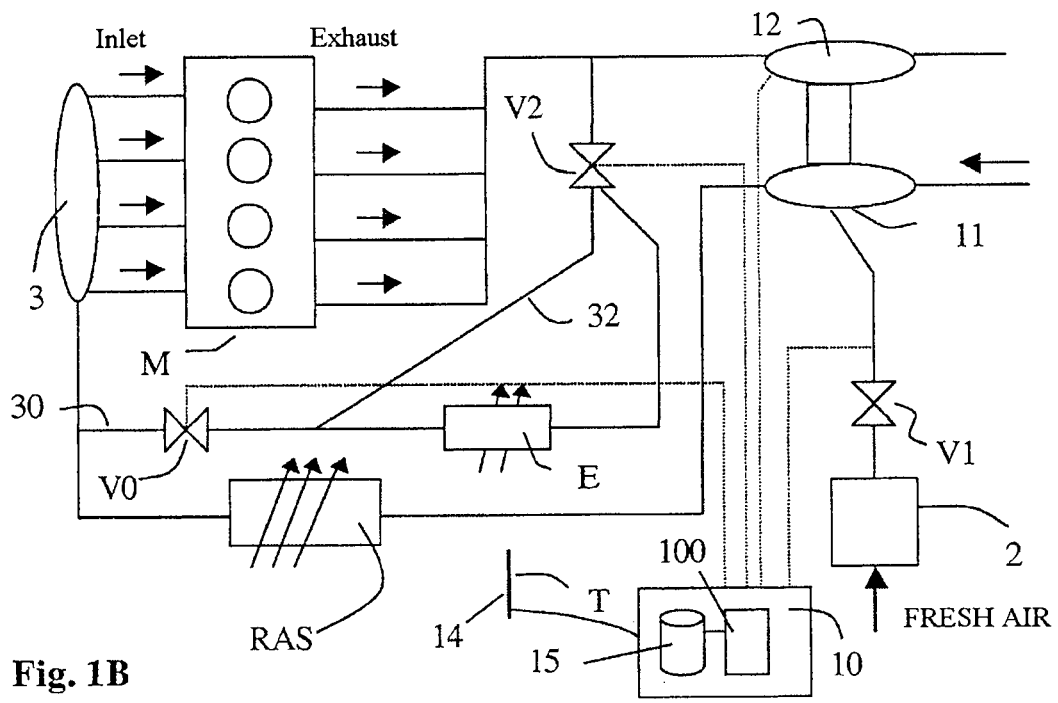

With reference to FIG. 1A, the invention proposes a method for controlling at least one EGR valve (V0) for recirculating exhaust gases during the start-up phase of a diesel engine (M) that has an external combustion control system with EGR. This method is implemented by a control device (10) provided with a processing unit (100), for controlling the openness of an EGR valve (V0). In the nonlimiting example an engine (M) is equipped with high-pressure EGR. The recirculated exhaust gases are introduced upstream of the air inlet manifold (3) and for example downstream of the intercooler (RAS). The gases that are to be recirculated are tapped off upstream of the turbine (12) releasing the exhaust gases, as illustrated in FIG. 1A. Exhaust gas recirculation (EGR) in a high-pressure EGR setup makes it possible in particular to shorten the circuit which, using a single valve (V0), gives the system a more rapid response time. The inlet manifold (3) thus receives exhaust gases in addition to the mixture with fresh air from the charge air compressor (11). With reference to FIG. 1B, a bypass valve (V2) is to be kept open to the bypass pipe of the EGR circuit.

The system is provided for example with means of admitting fresh air to the charge air compressor (11). These means of admitting fresh air to the compressor (11) may include an inlet pipe fitted with an inlet valve (V1) to regulate the fresh air flow rate. This fresh air is, for example, filtered beforehand using a filter unit (2) or similar purifying means as illustrated in FIGS. 1A and 1B. The inlet valve (V1) may be controlled by the control device (10).

Figure 2:
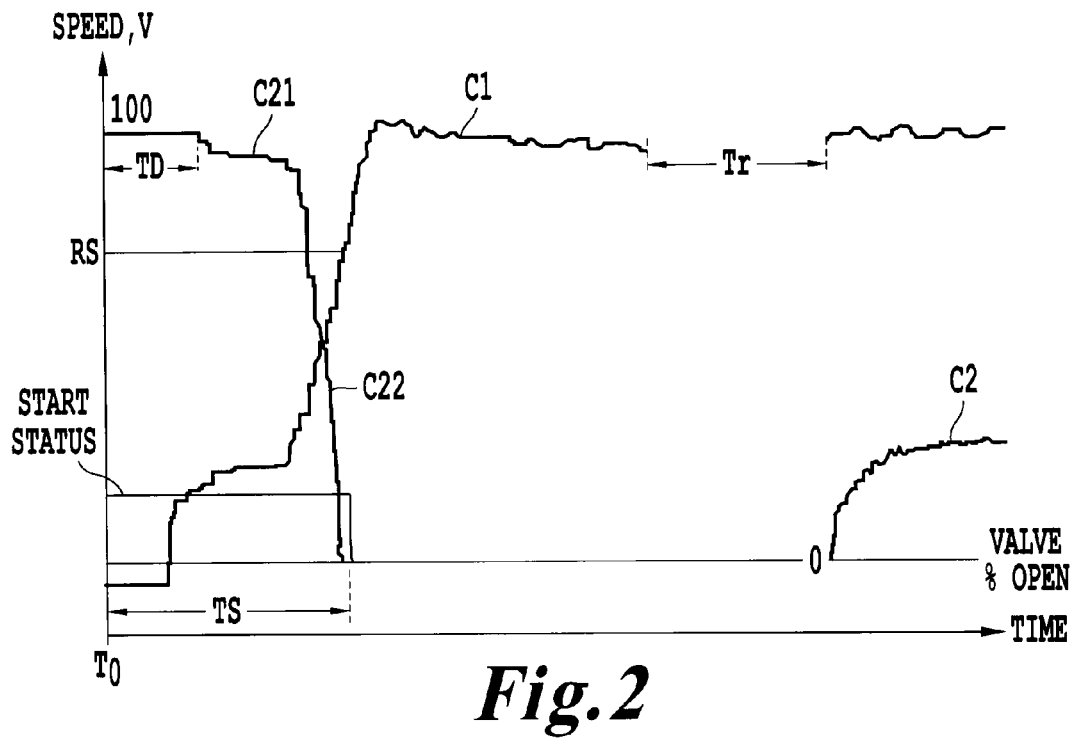
FIG. 2 shows a diagram depicting the change in the percentage openness of the EGR valve during the increase in speed in the cold start up phase.

In the embodiment of FIG. 2, the control device (10) is able first of all to open the EGR valve (V0) wide open for a short time (TD) measured from the moment (T0) the starting of the engine (M) is initiated and then, for the period (TS) over which engine (M) is starting, during which the engine speed increases to an end-of-start threshold speed (RS), the control device (10) controls the partial closure of the EGR valve (V0). This closure is controlled progressively as a function of an openness setpoint determined via calibration using data representative of an engine speed (V) and of an ambient temperature (T).

Unlike a conventional configuration, the EGR valve (V0) is used in the wide open position when the engine is being turned over by the starter motor in order to allow gases to enter the EGR pipe (30). In the context of the invention, it is preferable for the control device (10) to manage this valve (V0) by opening it even before the starter motor is actuated. Once the start-up phase is complete, the EGR valve (V0) is completely closed. In a preferred embodiment of the invention, complete closure is commanded when a speed threshold (RS) lower than idling speed is reached. This makes it possible to prevent engine (M) instability after start-up.

During the cold start up phase, the opening of the EGR valve (V0) does not mean that exhaust gases are recirculated but means that any air/fuel mixture that has not undergone combustion is recirculated. While the gain in temperature effect is negligible (the gain in temperature associated with compression is lost as the mixture expands), there is another potential gain associated with the following effects:

a) the mixture readmitted allows a greater amount of fuel to build up in the cylinder during combustionless cycles, and allows this to happen without increasing the injected fuel delivery, which means that the thermodynamic conditions in the cylinder are improved and the engine therefore starts better;
b) the fuel vaporized and homogenized in the air during a first injection is a factor involved in increasing the number of sites of local richness which are liable to encounter the glow plug and therefore to burn; and
c) creating a short, more permeable, gas exhaust and inlet circuit leads to a very small increase in the cranking speed.

It will be appreciated that the aforementioned effect b) may prove to be very beneficial in the case of an atypical "technical design" of combustion chamber in which the glow plug location does not allow the injected jets of fuel to pass over this glow plug (the effect of the spray angle and lack of any "swirl" effect).

In the embodiment of FIG. 1B the gases reintroduced by the EGR pipe can follow a shorter path along a bypass pipe (32). In the case of a technical design DT with EGR cooler (E) and bypass pipe (32), the recirculated air/fuel mixture has preferably to take the bypass route. This is because it is more advantageous in this case for the gases to be recirculated quickly during a cold start in order to improve the self-ignition conditions of the mixture in the cylinder. Passing the EGR gases through the cooler (E) is preferably to be avoided because that runs counter to the desired objective. It will be understood that cooling the gases combined with the lower permeability of the cooler heat exchanger (E) by comparison with the bypass pipe (32) means that the gases reach the nearby cylinder not only colder but in lower quantity. The permeability of the EGR circuits needs to be good in order to ensure that the gains afforded by the proposed solution will be as great as possible.

In addition, if some of the fuel evaporates during compression, it may condense on its way through the cooler (E) and therefore no longer offer the sites of richness liable to burn. It will therefore be understood that the EGR valve (V0) and the bypass valve (V2) to be opened are positioned in such a way as to allow rapid recirculation that does not cool the recirculated gases. In the case of a technical design that envisions a variable-geometry turbocompressor, the vanes of the turbine (12) need to be kept closed in order to encourage the recirculated gases to flow along the pipe (30).

With reference to FIG. 1A, the control device (10) controls at least one exhaust gas recirculation EGR valve (V0) during the start-up phase of the diesel engine (M) in order to adjust the gradual reduction in recirculation. The reduction needs to encourage the increase in speed of the engine (M). To do that, the device comprises actuator means designed to keep the EGR valve (V0) wide open for a short time (TD) measured from the moment (T0) the starting of the engine (M) is initiated, memory storage means (15) for storing at least one item of information representative of an end-of-start threshold speed (RS) and means of detecting a start-up phase.

Experiments conducted by the inventor on cold starts with an engine that had a combustion chamber that experienced difficulties with starting both in terms of initiating combustion and in terms of getting the engine up to speed (low compression ratios of 16 or below) have demonstrated that externally keeping the EGR valve wide open during the cold start makes it possible to improve the starting of the engine but generally results in the engine (M) stalling through lack of oxygen just after it is started.

A second test with the EGR valve (V0) partially open after a time of about 1.5 seconds (this time is chosen because of a lag before the engine receives the EGR gases) demonstrated an improvement in the increase in engine speed and that the engine does not stall. However, the idling obtained is unstable.

In a preferred embodiment, the control device (10) according to the invention aims to obtain an improvement in starting by opening the EGR valve (V0) to wide open, particularly in starting time (and ditto for the time of 1st combustion) and in terms of the quality of the increase in engine speed (clean start) while at the same time providing a certain amount of start-up continuity that takes account of the requirements of the engine (M).

To this end, the control device (10) is associated with means (not depicted) of estimating an engine speed (V) and with means (14) of estimating an ambient temperature (T). The estimates may simply result from measuring the engine speed (V) and measuring the ambient temperature (T). Means of gathering data representative of the estimated ambient temperature (T) and of the estimated engine speed (V) are provided in the control device (10) to take account of the requirements of the engine (M). In other words, the device (10) may be provided with a function for adjusting the supply of air/fuel mixture as soon as the engine (M) starts. In one embodiment of the invention, the operating status of the EGR valve (V0) control can be parametrized to keep this valve open during the cold start of the engine (M) and the envelope defining this operating status may be bounded by a water temperature threshold, a maximum speed threshold and the status of a startbit. A bit recognizing an engine restart status may also be provided.

With reference to FIG. 1A, during this status that corresponds to the duration of the cold start, the position of the EGR valve of the high-pressure EGR type is, for example, controlled as a function solely of setpoints regarding the openness of the EGR valve (V0) (any air flow rate setpoints would not be taken into consideration). In one embodiment of the invention, open-loop position control is sufficient and it is permissible not to use control of the PID type because the increase in engine speed during the cold start is sufficiently rapid.

The control device (10) comprises pairing means for pairing an EGR valve (V0) openness setpoint with the data supplied by the data-gathering means and of using this setpoint to control the actuator means in order to control partial closure of the EGR valve (V0) during the start-up phase. In a preferred embodiment of the invention, a map of the 8×8 type for controlling the position of the EGR valve is needed to determine the openness setpoint. This map is, for example, defined by the speed (engine speed) on the abscissa axis and by the water temperature on the ordinate axis. The water temperature makes it possible to have available information representing the ambient temperature (T) for the engine (M). In one embodiment of the invention, this ambient temperature can be obtained by measuring the temperature of an engine (M) coolant.

The setpoint map (position; flow rate; pressure, etc.) is built up in the way known per se of two inputs for the control device (10). These inputs represent the axes of the map: here, they are the engine speed on the abscissa axis and the water temperature on the ordinate axis. The content of the map (the Z axis) corresponds to the desired parametrizing for controlling the actuator concerned, this parametrizing being optimized by the operator to suit the responses of the engine (M) under investigation during starts performed under various environmental conditions (−30 to +20 degrees Celsius). According to the invention, the parametrizing relates to the setpoint by which the EGR valve is opened/closed, given as a percentage, termed the openness setpoint or position setpoint.

In respect of said map, the Z axis may be the desired position (%) open command duty cycle RCO, that is to say a percentage by which the EGR valve (V0) is to be open. The choice of the breakpoints on the X and Y axes of this are to be defined as follows:
- with each zero or negative reference water temperature (e.g. −23/−20/−15/−10 and 0° C.) it is necessary to pair a speed "breakpoint" equal to the cranking speed of the application concerned. The EGR valve will need to be wide open at these points.
- the last three speed "breakpoints" are defined in such a way as to have, respectively, a speed known as the combustion-initiated speed (for all water temperatures), a speed known as the part-started speed (400 to 500 rpm) and a high speed known as the started speed (750 to 800 rpm).

At the present time, such maps do not exist in computer software. According to the invention, this map forms part of the desired adjustment strategy for allowing the EGR valve (V0) to be opened during a cold starting of the engine while at the same time ensuring that the engine starts correctly.

It will be understood that the control device (10) controls the EGR valve (V0) changing from wide open under cranking and then closing this valve at two gradients as the engine speed increases for a given water temperature. With reference to FIG. 2, the curve (C2) which corresponds to the percentage openness of the EGR valve (V0) thus comprises a region (C21) of modest initial reduction and a following region (C22) of high second reduction, resulting in full closure of the EGR valve (V0).

The table set out hereinbelow illustrates one example of precalibration of the setpoints map used for controlling the EGR valve (V0).

For an engine (M) the cranking and idling speeds of which are respectively:

| T WATER (° C.) | Cranking speed (rpm) | Idling speed (rpm) |
|---|---|---|
| −23 | 145 | 1150 |
| −20 | 155 | 1100 |
| −15 | 170 | 1050 |
| −10 | 180 | 1000 |
| 0 | 210 | 950 |
| 10 | 230 | 900 |
| 20 | 245 | 850 | the proposed RCO map of the 8×8 type may then be as follows:

|  | 150 | 170 | 180 | 210 | 245 | 400 | 750 | 900 |
|---|---|---|---|---|---|---|---|---|
| −30 | 60 | 57 | 55 | 52 | 50 | 37 | 20 | 5 |
| −23 | 60 | 57 | 55 | 52 | 50 | 37 | 20 | 5 |
| −20 | 60 | 58 | 56 | 53 | 49 | 35 | 15 | 5 |
| −15 | 60 | 60 | 58 | 54 | 48 | 33 | 12 | 2 |
| −10 | 60 | 60 | 60 | 55 | 47 | 30 | 10 | 0 |
| 0 | 60 | 60 | 60 | 60 | 46 | 26 | 8 | 0 |
| 10 | 60 | 60 | 60 | 60 | 55 | 20 | 5 | 0 |
| 15 | 0 | 0 | 0 | 0 | 0 | 0 | 0 | 0 |

For X and/or Y values that fall between two tabulated values, the setpoint is obtained between two breakpoints by linear interpolation of the values surrounding the point. A correct choice of "breakpoints" makes it possible to avoid any discontinuity in the engine requirements which might otherwise not be seen by linear interpolation.

In one embodiment of the invention, the processing unit of the control device (10) is able beforehand to calculate an end-of-start threshold speed (RS) using a look-up table stored in the memory storage means (15) and able to take account of the ambient temperature (T) initially gathered in order to determine the threshold speed (RS). This look-up table may consist of a precalibration map table relating, for example, to the anticipated cranking speed, the anticipated idling speed, and the speed threshold anticipated to be lower than the idling speed in order to avoid instabilities after start-up.

In the example of FIGS. 1 and 2, the pairing means of the control device (10) make it possible, during the start-up phase, to compare an estimated (measured) engine speed supplied by the data-gathering means with a value representative of the end-of-start threshold speed (RS). These pairing means then deliver a setpoint to close the EGR valve (V0) fully as soon as the threshold value is reached.

The control method according to the invention will now be described in greater detail in conjunction with FIGS. 2 and 3.

When the engine (fitted to a vehicle such as a motor car) needs to be started, the method uses the control device (10) to perform a step (51) of opening the EGR valve (V0) wide open. With reference to FIG. 2, for a short time (TD) measured from the moment (T0) the starting of the engine (M) is initiated, this valve (V0) is kept in the wide open (100% open) position. This short time (TD) allows the air/fuel mixture remaining in the engine (M) and which has not undergone combustion to be recirculated. The speed and ambient temperature (T) parameters are therefore taken into consideration via the map to control the gradual closing of the EGR valve (V0).

Figure 3:
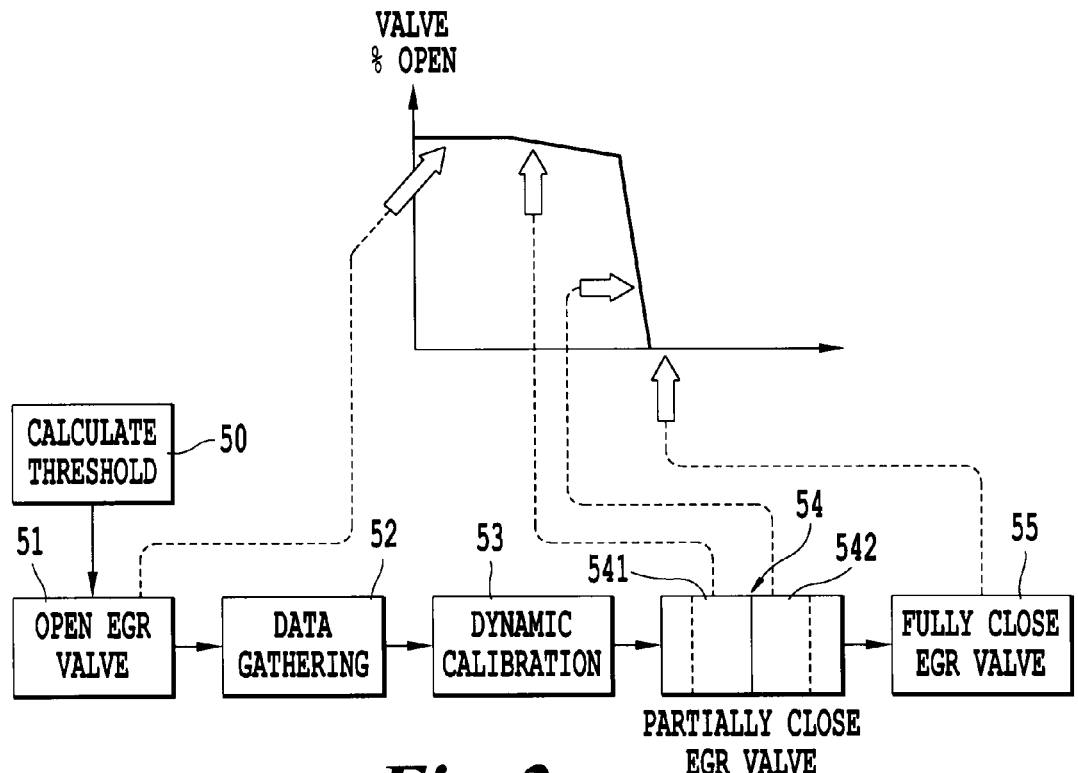
FIG. 3 shows a flow diagram illustrating the steps of the method according to the invention.

In the embodiment of FIGS. 2 and 3, during the engine (M) starting period (TS) in which the engine speed increases up to an end-of-start threshold speed (RS) the method anticipates a progressive step (54) whereby the control device (10) partially closes the EGR valve (V0) in accordance with the openness setpoint. This setpoint is determined during the dynamic calibration step (53) which uses the processing unit (100) to determine the EGR valve (V0) openness setpoint as a function of the data supplied to the control device (10) during a data-gathering step (52). The data representative of the engine speed (V) and of the ambient temperature (T) are supplied by sensors (14) to the device (10) during this data-gathering step (52). A probe (14) may, for example, be used to measure a water temperature which constitutes said ambient temperature (T).

The dynamic calibration step (53) may use a setpoint map of the aforementioned type in which two parametrizing axes are represented by engine speed information on the abscissa axis and ambient temperature information (T) on the ordinate axis. The third axis envisioned for the openness setpoint is arranged such that the processing unit (100) can determine the setpoint that will allow the control device (10) to control the actuator which adjusts the position of opening of the EGR valve (V0). Said map is, for example, stored by the control device (10) in memory storage means (15) beforehand in the form of a look-up table. The dynamic calibration step (53) comprises linear interpolation performed by calculating means of the processing unit (100) in order to determine the openness setpoint. The data supplied to the control device (10) during the data-gathering step (52) and the map together thus make it possible to determine a setpoint for every operating point. The dynamic calibration step (53) may also employ an altitude indicating parameter which is used to correct or to weight the openness setpoint.

In one embodiment of the invention, the step (51) during which the EGR valve (V0) is wide open is performed only if the ambient temperature (T) does not exceed a calibrateable temperature threshold and if the engine (M) has not started, the start status of the engine (M) being detected by the control device (10) using information of the startbit type. The defining envelope used to define the function whereby the EGR valve is initially opened may thus for example be limited to conditions of cold temperature (water temperature<calibrateable temperature threshold). The valve must thus be closed as soon as the temperature threshold is reached or as soon as the engine speed reaches/crosses a calibrateable speed threshold (RS) or alternatively as soon as an engine start status information item (startbit zero for example) is received.

As illustrated in FIG. 3, a step (55) whereby the EGR valve (V0) is fully closed is initiated by the control device (10) at least when the end-of-start threshold speed (RS) is reached. A preliminary step (50) of calculating the end-of-start threshold speed (RS) threshold may be performed by the processing unit (100) using a look-up table stored in memory in the control device (10). This table takes account of the ambient temperature (T) initially gathered.

With reference to FIGS. 2 and 3, the method according to the invention makes it possible to regulate the openness command by closing the EGR valve (V0) at two rates during the increase in engine speed, for a given water temperature. The progressive step (54) in which the EGR valve (V0) is partially closed in effect comprises a first substep (541) during which partial closure is performed at a slow first overall rate of closure; followed by a second substep (542) during which partial closure is continued at a higher second overall rate of closure. In one embodiment of the invention the second rate is at least four times faster than said first rate. The differences in gradient between the first falling region (C21) of the curve (C2) and the second falling region (C21) illustrate this method of control in FIG. 2. When the engine speed illustrated by the curve (C1) in FIG. 2 crosses the threshold (RS) and reaches idling speed (steady state) the EGR valve (V0) is closed.

The EGR valve (V0) can thereafter, well after starting, be opened to operate under "hot" operating conditions. The time that elapses between turning the engine (M) over and initial closure of the valve performed in step (55) may be of the order of 2 seconds. This time period is naturally extended appreciably, the lower the ambient temperature (T) (for example −25° C.). FIG. 2 also illustrates the lag (Tr) required before the engine (M) receives the recirculated EGR gas once the opening of the EGR valve has been commanded.

Other functionalities associated with initial control of the EGR valve (V0) using indicators/diagnostics may be performed by the control device (10) according to the invention. The known functionalities performed for checking for the presence of the EGR valve and checking whether it may have become jammed (checking the continuity and level of the electrical signal from the valve) can also be maintained. It is simply necessary for these tasks to have been completed before the engine (M) is turned over. The EGR valve (V0) is preferably opened even before the engine (M) reaches TDC (Top Dead Center).

Ideally, the aforementioned method is run on the basis of instructions originating from a computer or control unit provided with appropriate software stored in the memory storage means of the computer.

One of the advantages of the method according to the invention is that it improves the temperature and pressure conditions in the cylinders to allow a good cold start (at −30 to +10° C., for example) in a diesel engine of the turbocharged type. This type of start optimized using EGR is very advantageous, particularly in the case of engines with low compression ratios.

It should be obvious to those skilled in the art that the present invention can be embodied in numerous other specific forms without departing from the field defined by the scope of the attached claims, and that the invention must not be restricted to the details given hereinabove.

The invention claimed is:

1. A method for controlling at least one exhaust gas recirculation EGR valve during a start-up phase of a diesel engine of type including an external system for controlling combustion using EGR, implemented by a control device including a processing unit, the method comprising:

the control device opening the EGR valve to a wide open position, for a short time measured from a moment starting of the engine is initiated and at least for a period over which the engine is started so that engine speed can be increased to an end-of-starting threshold speed;

the control device gathering data representative of the engine speed and an ambient temperature, the data being supplied by sensors;

dynamic calibration using the processing unit to determine an EGR valve openness setpoint as a function of the data supplied to the control device during the data gathering; and a progressive operation in which the control device partially closes the EGR valve in accordance with the openness setpoint determined during the dynamic calibration.

2. The method as claimed in claim 1, further comprising fully closing the EGR valve by the control device at least when the end-of-start threshold speed is reached.

3. The method as claimed in claim 1 further comprising a preliminary operation during which the processing unit calculates the threshold for the end-of start threshold speed using a look-up table stored in a memory in the control device and taking account of the gathered ambient temperature.

4. The method as claimed in claim 1 in which the data gathering includes measuring temperature of an engine coolant to measure the ambient temperature.

5. The method as claimed in claim 1 in which the dynamic calibration uses a setpoints map in which two parametrizing axes are represented by engine speed information on the abscissa axis and ambient temperature information on the ordinate axis, a third axis being provided for the openness setpoint so that an actuator that adjusts how open the EGR valve is can be controlled, the map being pre-stored in a memory of the control device in a form of a look-up table.

6. The method as claimed in claim 5 in which the control setpoint represents a percentage indicating how open/closed the EGR valve is.

7. The method as claimed in claim 5 in which the opening the EGR valve to the wide open position is performed only if the ambient temperature does not exceed a calibratable temperature threshold and if the engine has not started, a start status of the engine being detected by the control device using information of startbit type.

8. The method as claimed in claim 5 in which the dynamic calibration includes linear interpolation performed by the processing unit to determine the openness setpoint from the data supplied to the control device during the data gathering.

9. The method as claimed in claim 7 in which the dynamic calibration includes linear interpolation performed by the processing unit to determine the openness setpoint from the data supplied to the control device during the data gathering.

10. The method as claimed in claim 1 in which the progressive operation in which the EGR valve is partially closed includes:
    performing partial closure at a slow first overall rate of closure; followed by
    continuing partial closure at a second overall rate of closure that is at least four times faster than the first rate.

11. The method as claimed in claim 1 in which the dynamic calibration also makes use of an altitude indicating parameter by which the openness setpoint is corrected or weighted.

12. The method as claimed in claim 1 implemented using a control device of computer type and using a recirculation system of high pressure type in which the EGR valve is opened by a control signal originating from the control device during the opening the EGR valve to a wide open position to recirculate an air/fuel mixture that has not undergone combustion from upstream of an exhaust turbine to an inlet manifold of the engine.

13. The method as claimed in claim 1 further comprising controlling a routing mechanism to direct an entire flow of recirculated gas to a bypass pipe parallel to an EGR cooler.

14. The method as claimed in claim 12 further comprising controlling the control device to control a variable-geometry turbocompressor to keep vanes of the turbine closed, to increase flow rate of recirculated gas.

15. A device for controlling at least one exhaust gas recirculation EGR valve during a start-up phase of a diesel engine of type including an external combustion control system using EGR, the device comprising:
    a processing unit;
    memory storage means for storing at least one item of information representative of an end-of-start threshold speed;
    means for detecting a start-up phase;
    actuator means for keeping the EGR valve wide open for a short time measured from a moment starting of the engine is initiated;
    means for estimating an engine speed;
    means for estimating an ambient temperature;
    means for gathering data representative of the estimated ambient temperature and of the estimated engine speed; and
    pairing means for pairing an EGR valve openness setpoint with the data supplied by the data gathering means and for using a setpoint to control the actuator means to control partial closure of the EGR valve during the start-up phase.

16. The device as claimed in claim 15 in which the pairing means compares, during the start-up phase, an estimated engine speed value supplied by the data-gathering means with a value representative of the end-of-start threshold speed, the pairing means delivering a setpoint to fully close the EGR valve as soon as the threshold value is reached.

17. The device as claimed in claim 15 in which the processing unit is configured to calculate an end-of-start threshold speed beforehand using a look-up table stored in the memory storage means making it possible to take account of the ambient temperature gathered initially to determine the threshold speed.

18. A computer readable medium including computer executable instructions that can be loaded into the memory of a computer to execute a method for controlling at least one exhaust gas recirculation EGR valve for an engine when the computer executable instructions are executed on the computer, said computer readable medium including:
    first computer executable instruction for opening the EGR valve to a wide open position, for a short time measured from a moment starting of the engine is initiated and at least for a period over which the engine is started so that engine speed can be increased to an end-of-starting threshold speed;
    second computer executable instruction for gathering data representative of the engine speed and an ambient temperature; third computer executable instruction for dynamic calibration to determine an EGR valve openness setpoint as a function of the data supplied during the data gathering; and
    fourth computer executable instruction for partially closing the EGR valve in accordance with the openness setpoint determined during the dynamic calibration.

* * * * *